No. 618,836. Patented Feb. 7, 1899.
W. BUNDY, J. M. DOAN & S. HESLET.
TIRE.
(Application filed Oct. 12, 1897.)
(No Model.)

Witnesses
J. Frank Culverwell,
Edwin Cruse.

Inventors.
William Bundy,
John M. Doan and
Scott Heslet.

By their Attorneys,

C. A. Snow & Co.

THE NORRIS PETERS CO., PHOTO-LITHO., WASHINGTON, D. C.

UNITED STATES PATENT OFFICE.

WILLIAM BUNDY, JOHN M. DOAN, AND SCOTT HESLET, OF PENN, MICHIGAN.

TIRE.

SPECIFICATION forming part of Letters Patent No. 618,836, dated February 7, 1899.

Application filed October 12, 1897. Serial No. 654,961. (No model.)

*To all whom it may concern:*

Be it known that we, WILLIAM BUNDY, JOHN M. DOAN, and SCOTT HESLET, citizens of the United States, residing at Penn, in the county of Cass and State of Michigan, have invented a new and useful Tire, of which the following is a specification.

Our invention relates to tires for vehicle-wheels, especially designed for use in connection with bicycles, buggies, &c.; and the object in view is to provide an efficient and durable tire capable of being manufactured with facility and possessing all of the essential advantages without the defects of a pneumatic tire. In other words, it is our object to provide a tire which is of sufficiently elastic construction to fulfil all the necessary conditions without being liable to either temporary or permanent damage by reason of punctures and also to provide a tire of this class wherein the filling materials are so arranged as to avoid displacement after protracted use.

Further objects and advantages of this invention will appear in the following description, and the novel features thereof will be particularly pointed out in the appended claim.

Figure 1:
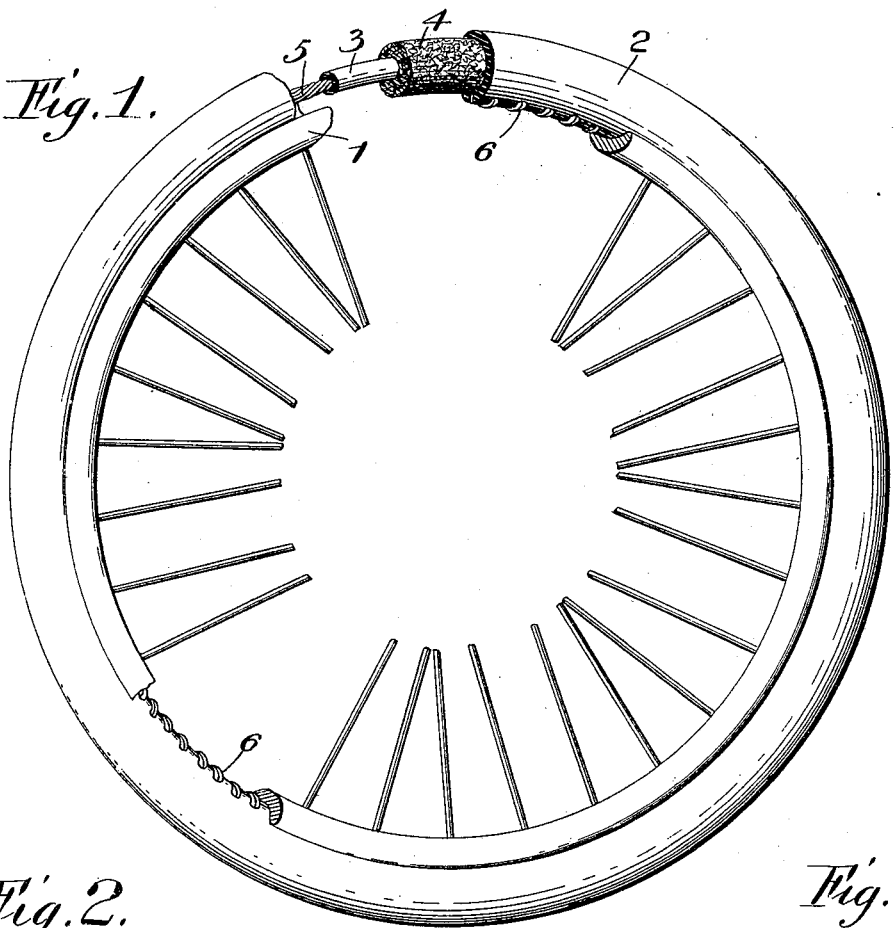
Figure 2:
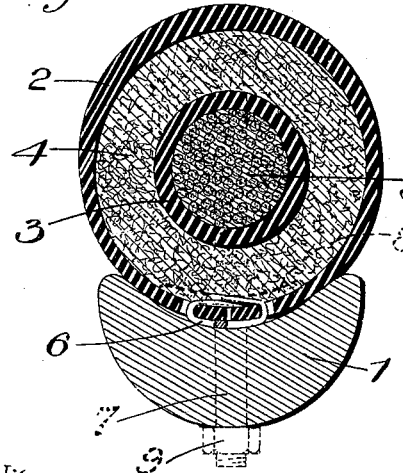
Figure 3:
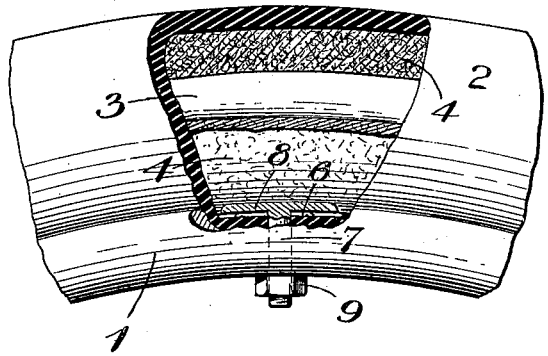

In the drawings, Figure 1 is a perspective view, partly broken away, of a wheel provided with a tire constructed in accordance with our invention. Fig. 2 is a transverse section of the tire and the rim in which it is seated. Fig. 3 is a side view of a portion of the tire and rim, partly broken away, to illustrate means for securing the tire to the rim.

Similar numerals of reference indicate corresponding parts in all the figures of the drawings.

The tire embodying our invention is shown applied to a wheel-rim 1, which is of the ordinary dished or channeled construction, with its outer face preferably of a contour adapted to fit that of the tire.

The tire consists, essentially, of outer and inner concentric tubes 2 and 3, of rubber or equivalent material, separated by an interposed wrapped layer 4 of fibrous material, such as felt, preferably in the form of a continuous strip or sheet, said layer being of even thickness throughout, so as to maintain the inner tube concentric with the outer tube. Within the inner tube is arranged another filling 5, which preferably consists of parallel bunched strands of cotton or similar material arranged longitudinally of the tube in which they are disposed and snugly filling the same. Obviously this inner filling or core 5 by reason of the separate strands of which it consists is capable of yielding transversely by the relative change of positions of the strands or the rolling or movement thereof upon each other, and also by reason of the fact that they are adapted to be compressed more or less to fill the interstices which necessarily exist therebetween. A further function performed by this core, consisting of parallel strands, however, is due to the fact that they resist the stretching of the tire, and hence serve to maintain the tire properly seated upon the rim of the wheel, whereby in connection with bicycle-wheels under ordinary circumstances it is unnecessary to provide auxiliary devices. When, however, it is desired, as in connection with buggy-wheels, to more firmly attach the tires, it may be accomplished by employing bolts 7, having heads 8, constructed to bear snugly against the inner surface of the outer tube 2 and extending through said outer tube and the wheel-rim and being fitted in contact with the inner surface of the latter with taps 9. Also when the outer tube, which is preferably increased in thickness at the tread of the rim, is open at its inner side the edges thus provided may be united by lacing 6, as in the ordinary practice. Therefore it will be obvious that the tire embodying our invention consists of suitable tubular containers, within each of which is arranged a filling of compressible material. That material which serves as a filling for the outer tube and also to space the inner tube therefrom is of strip or sheet form, which may be wrapped longitudinally or spirally around the inner tube, and which therefore is not liable to become displaced by the use of the wheel. This outer filling possesses transverse elasticity, but is also adapted to communicate pressure to the inner tube, and we employ felt as the material of this outer filling for the reason that, while possessing an elastic quality, it is not liable in use to become permanently condensed, but, on the other hand, returns to its normal volume when relieved of pressure.

The inner filling, however, or that which is arranged within the inner tube 3, is of an entirely different quality, consisting, as above indicated, of a series of bunched continuous parallel strands extended longitudinally of the tire, and hence capable of transverse compression or displacement to allow yielding of the tire, while preserving their positions longitudinally to avoid "creeping" and ultimate accumulation at one or more points in the circumference of the tire.

Those familiar with the art to which our invention appertains are aware of the fact that in a "filled" tire or a tire of the cushion class there is liability of relative creeping of the members, whereby the inward uniform distribution of the members is lost and the tire becomes irregular or lumpy in contour.

The construction, relative arrangement, and general materials of the tire embodying our invention are adapted to avoid this difficulty, and thus provide a simple, compact, efficient, and durable tire of this type possessing the necessary elastic qualities to fulfil the ordinary conditions of use.

Having described our invention, what we claim is—

The herein-described tire for vehicle-wheels, comprising outer and inner concentric tubes, and wrapped or folded filling of sheet material interposed between said tubes and snugly occupying the annular space therebetween, and an inner tube-filling consisting of continuous parallel strands arranged longitudinally of the tire to resist stretching thereof, and maintain the tire at a uniform length, substantially as specified.

In testimony that we claim the foregoing as our own we have hereto affixed our signatures in the presence of two witnesses.

WM. BUNDY.
JOHN M. DOAN.
SCOTT HESLET.

Witnesses:
CLARA EBY,
ULYSSES S. EBY.